US006782094B1

(12) United States Patent
Venz et al.

(10) Patent No.: US 6,782,094 B1
(45) Date of Patent: Aug. 24, 2004

(54) SYSTEM AND METHOD FOR BACKUP NETWORK GLARE REDUCTION

(75) Inventors: William Venz, Seminole, FL (US); Theodore Heeren, Seminole, FL (US)

(73) Assignee: Paradyne Corporation, Largo, FL (US)

( * ) Notice: Subject to any disclaimer, the term of this patent is extended or adjusted under 35 U.S.C. 154(b) by 491 days.

(21) Appl. No.: 09/859,914

(22) Filed: May 17, 2001

Related U.S. Application Data

(60) Provisional application No. 60/237,210, filed on Oct. 2, 2000.

(51) Int. Cl.[7] .................................... H04M 3/10

(52) U.S. Cl. ....................... 379/279; 379/241; 379/229; 379/230

(58) Field of Search ................................ 379/279, 241, 379/230, 229; 370/219, 250

(56) References Cited

U.S. PATENT DOCUMENTS 5,046,181 A * 9/1991 Higuchi et al. ............. 370/360
5,303,290 A * 4/1994 Redberg et al. ............. 379/241
5,381,415 A * 1/1995 Mizutani ............... 370/110.01
5,487,110 A * 1/1996 Bray et al. ............. 379/220.01
6,137,875 A * 10/2000 Mo ............................ 379/241
6,731,744 B1 * 5/2004 Khuc et al. ............ 379/265.01

OTHER PUBLICATIONS

Bud Bates and Donald Gregory, "Voice and Data Communications Handbook" 1996, pp. 341–342.

* cited by examiner

*Primary Examiner*—Ahmad F. Matar
*Assistant Examiner*—M. C. Ubiles
(74) *Attorney, Agent, or Firm*—Thomas, Kayden, Horstemeyer & Risley, LLP

(57) ABSTRACT

A system for providing a backup network is disclosed that includes a glare detection circuit, an arbitration circuit, and a line control circuit. The glare detection circuit receives a dial signal associated with the call control circuit and a cause value from a backup circuit, and asserts a glare present signal responsive to the dial signal and the cause value being asserted. The arbitration circuit receives the glare present signal and produces an arbitration signal responsive to an arbitration procedure. The line control circuit receives the arbitration signal and determines whether the call control circuit will discontinue an outgoing call on the backup circuit and wait a specified period of time for an incoming call on the backup circuit or wait for the outgoing call on the backup circuit to be answered. Methods and other systems are also provided.

19 Claims, 7 Drawing Sheets

SYSTEM AND METHOD FOR BACKUP NETWORK GLARE REDUCTION

CROSS REFERENCE TO RELATED APPLICATIONS

This application is related to U.S. provisional application entitled "Glare Reduction in all ISDN calls" filed on Oct. 2, 2000 and accorded Ser. No. 60/237,210, which is hereby incorporated by reference.

TECHNICAL FIELD OF THE INVENTION

The present invention generally relates to network communications, and more particularly to backup networks, and a system and method for glare reduction in backup networks.

BACKGROUND OF THE INVENTION

In modern day communications, networks have become increasingly important in the public and private sectors. A large sector of our business society relies on the exchange of information, and this has made the reliability of networks of utmost importance in the continued growth and expansion of our economy. Unfortunately, the high traffic and complexity of those networks has made their reliability questionable.

In order to lessen the severity of these failures, backup networks have been developed over which information can continue to flow in the case of a failure. In the simplest sense, a backup network could be an analog modem connection, but in a more complex alternative, it could be an integrated services digital network (ISDN) connection or digital subscriber line (DSL) modem connection. These backup networks, although operating at lower data rates, have a much higher reliability than do other networks because they typically are implemented over the public switched telephone network (PSTN), which has been optimized for reliability for more than a half-century since the invention of the telephone. In typical implementations, when a failure is sensed by a system operating over a primary network, the system attempts to implement the backup network to communicate to the remote system which it was connected to until the failure or to another remote system if it cannot get back to the original remote system.

Problems can arise when this backup philosophy is widely implemented among networked computers. One such problem is a glare condition. A glare condition occurs when each system blocks the other from connecting, because each system senses the network failure simultaneously and attempts to establish the backup connection.

SUMMARY OF THE INVENTION

The present invention involves an improvement to backup networking methods, which reduces the impact of glare effects created when both endpoints simultaneously sense network failure. By employing the glare reduction system of the present invention, backup networks are able to sense the glare effect and adjust the backup network's dial control at each endpoint. By adjusting the dial control at each endpoint, the backup network will ensure that a connection will be made and will reduce the amount of time wasted when a glare condition is present.

When backup network glare reduction system in accordance with the present invention is used in connection with a backup network, the glare condition is sensed on the backup network. After the glare condition is sensed, each endpoint performs an algorithm to decide which endpoint is dominant and which is non-dominant. The non-dominant endpoint backs off and waits, while the dominant system immediately tries to reconnect to the non-dominant system.

Glare reduction can also be used in a wide variety of primary networks including frame relay, asynchronous transfer mode (ATM) networks, T-1 networks, hard-wired networks, etc. Moreover, glare reduction can be used with any type of backup network connection that can be accessed through a dialing method, including but not limited to, a plain old telephone service (POTS) connection, an integrated services digital network (ISDN) connection, a digital subscriber line (DSL) connection, etc.

The present invention can also be conceptualized as providing a method for communication across a backup network. This method can be broadly summarized by the steps of: detecting a glare condition, performing an algorithm to determine which endpoint is dominant, backing off at the non-dominant endpoint, and redialing immediately at the dominant endpoint.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

This invention can be better understood with reference to the following drawings. The components in the drawings are not necessarily to scale, emphasis instead being placed on clearly illustrating the principles of the present invention. Moreover, in the drawings, like reference numerals designate corresponding parts throughout the several views.

DETAILED DESCRIPTION OF THE PREFERRED EMBODIMENT

Figure 1A:
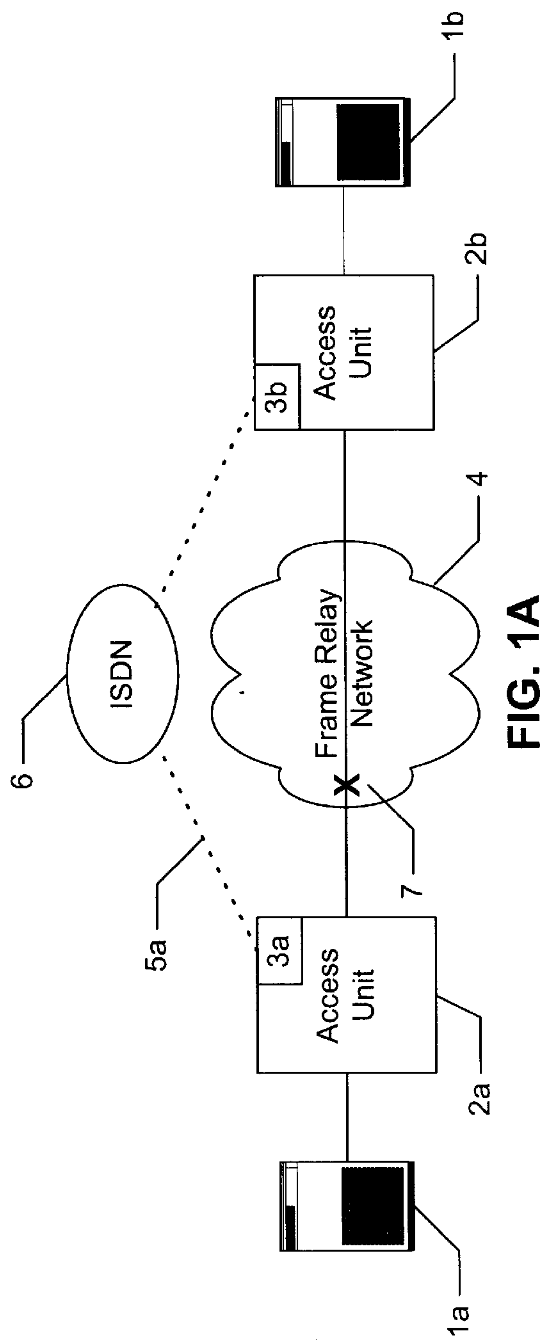
FIG. 1A is a hardware diagram depicting an example configuration of a backup network system that uses an integrated services digital network (ISDN) and a primary network system that uses a frame relay network.

The present invention provides systems and methods for the reduction of undesirable glare conditions. Referring first to FIG. 1A, an example of the hardware configuration that can employ the glare reduction system of the present system can be seen. This example configuration includes a local frame relay router 1*a* connected to a local access unit 2*a* with a data backup module (DBM) 3*a* configured to transfer data to a remote frame relay router 1*b* through a remote access unit 2*b* with DBM 3*b* across the frame relay primary network 4. In this configuration, the primary network 4 is backed up across path 5*a* by an ISDN backup network 6 in case a failure 7 develops.

Figure 1B:
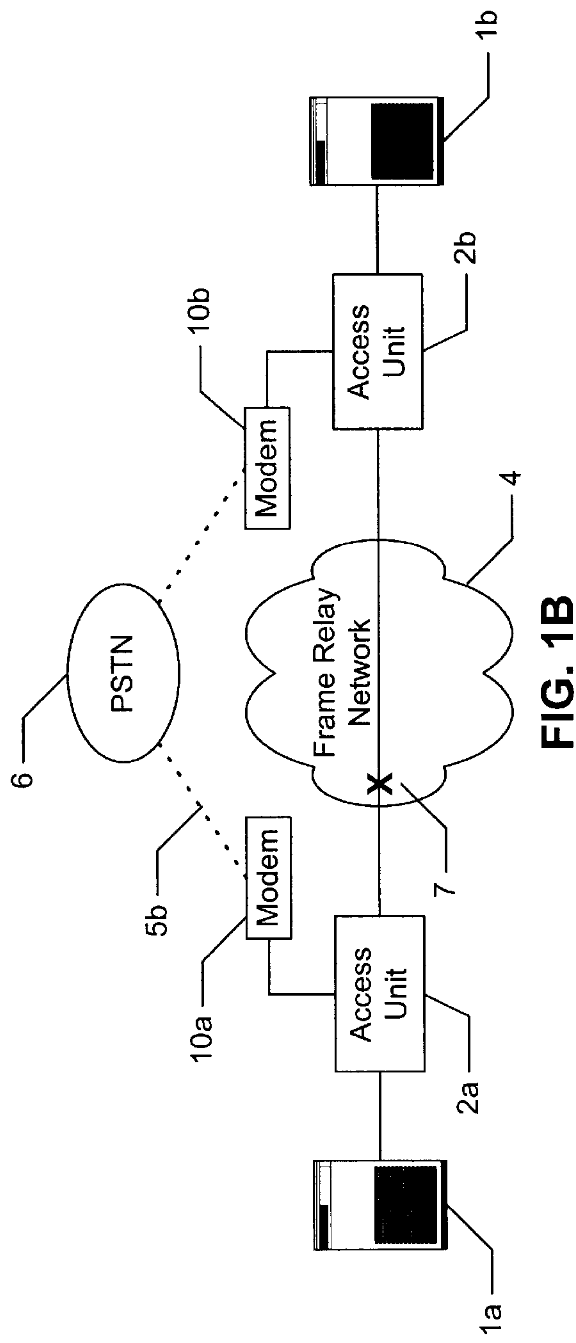
FIG. 1B is a hardware diagram depicting an example configuration of a backup network system that uses a public service telephone network (PSTN) and a primary network system that uses a frame relay network.

Another example of a hardware configuration that can employ the glare reduction system of the present invention is illustrated in FIG. 1B. This example configuration of the primary connection is identical to the configuration described in FIG. 1A. The local frame relay router 1*a* is connected to the local access unit 2*a* and is configured to transmit data to a remote frame relay router 1*b* through the remote access unit 2*b* across a frame relay network 4. However, the backup connection in this configuration comprises a dialup connection between modems 10*a* and 10*b* across path 5*b* through a telephone switched telephone network (PSTN) 6.

Figure 2:
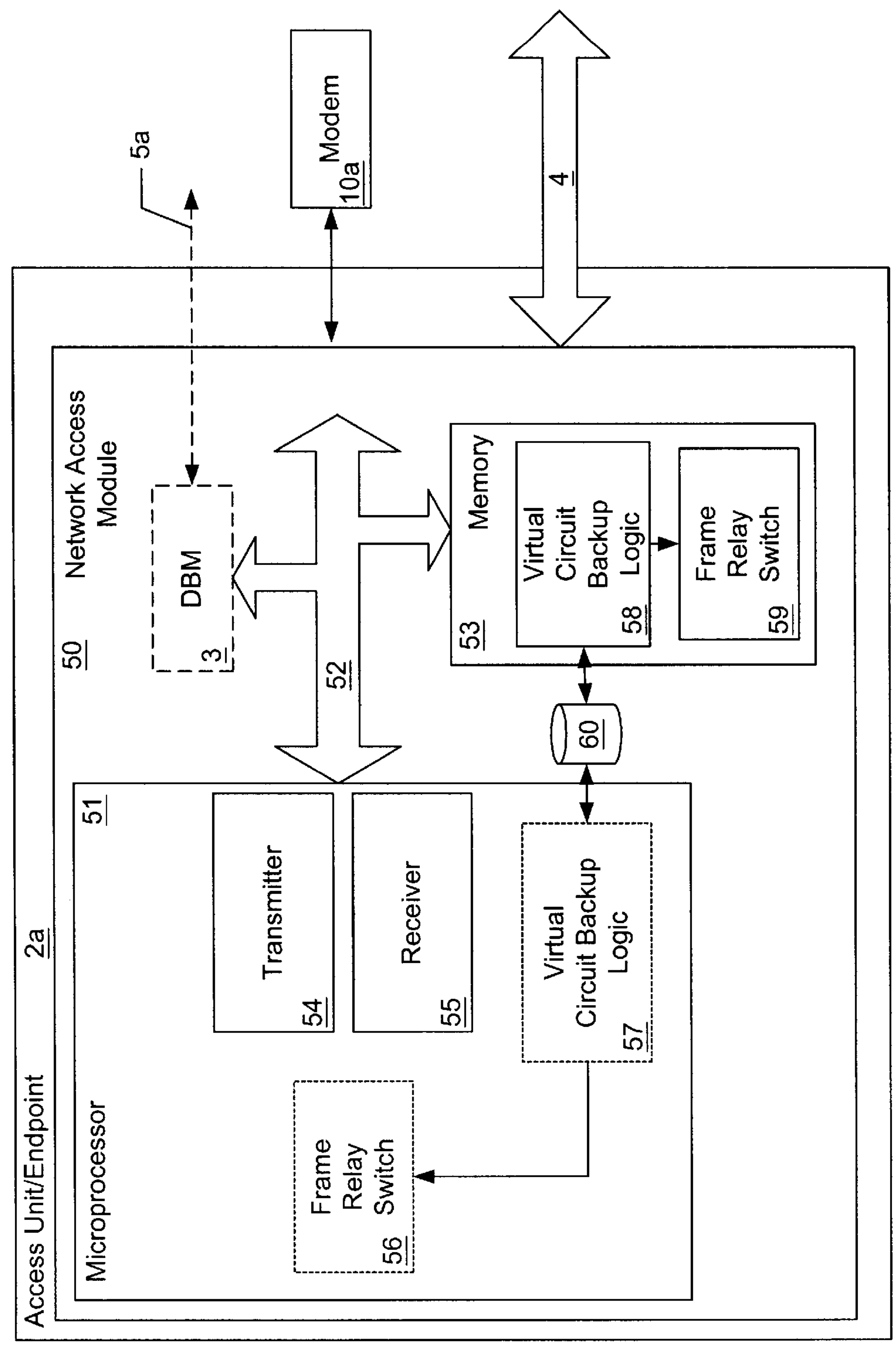
FIG. 2 is a schematic diagram of an access unit depicted in FIG 1A and FIG 1B.

FIG. 2 shows an example configuration of the access unit 2*a* (FIGS. 1A and 1B). The network access module (NAM) 50 is responsible for managing communications over the network 4 with remote access unit 2*b*. The NAM 50 is controlled by a processor, preferably in the form of a microprocessor 51. The microprocessor 51 communicates with and controls the DBM 3, the memory 53, and other components of the access unit 2*a*, including a modem 10*a* in an alternate configuration, by way of a local interface 52, which can comprise one or more buses. The microprocessor 51 is also configured to control the operation of the access unit's transmitter 54, receiver 55, a relay switch 56, and virtual circuit backup logic 57. Because the relay switch 56 and the virtual circuit backup logic 57 are both software algorithms executed by the microprocessor 51 in the preferred embodiment, they are depicted as residing in memory 53 as relay switch 59 and the virtual circuit backup logic 58.

In the preferred embodiment, as is shown in FIG. 2, the virtual circuit backup logic 58 is software stored on a computer readable medium in the form of memory 53. As is known in the art, the software-based virtual circuit backup logic 58 comprises an ordered listing of executable instructions for implementing logical functions. However, it should be noted that in alternative embodiments, the virtual circuit backup logic 58 could be implemented in hardware or in a combination of software and hardware. If implemented in hardware, as in an alternative embodiment, the virtual circuit backup logic 58 can implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As further shown in FIG. 2, the NAM 50 also includes a configuration database 60. The configuration database 60 can be accessed with the virtual circuit backup logic 57 in order to provide alternative routing configurations to the access unit 2*a* in case of any detected failure.

Figure 3:
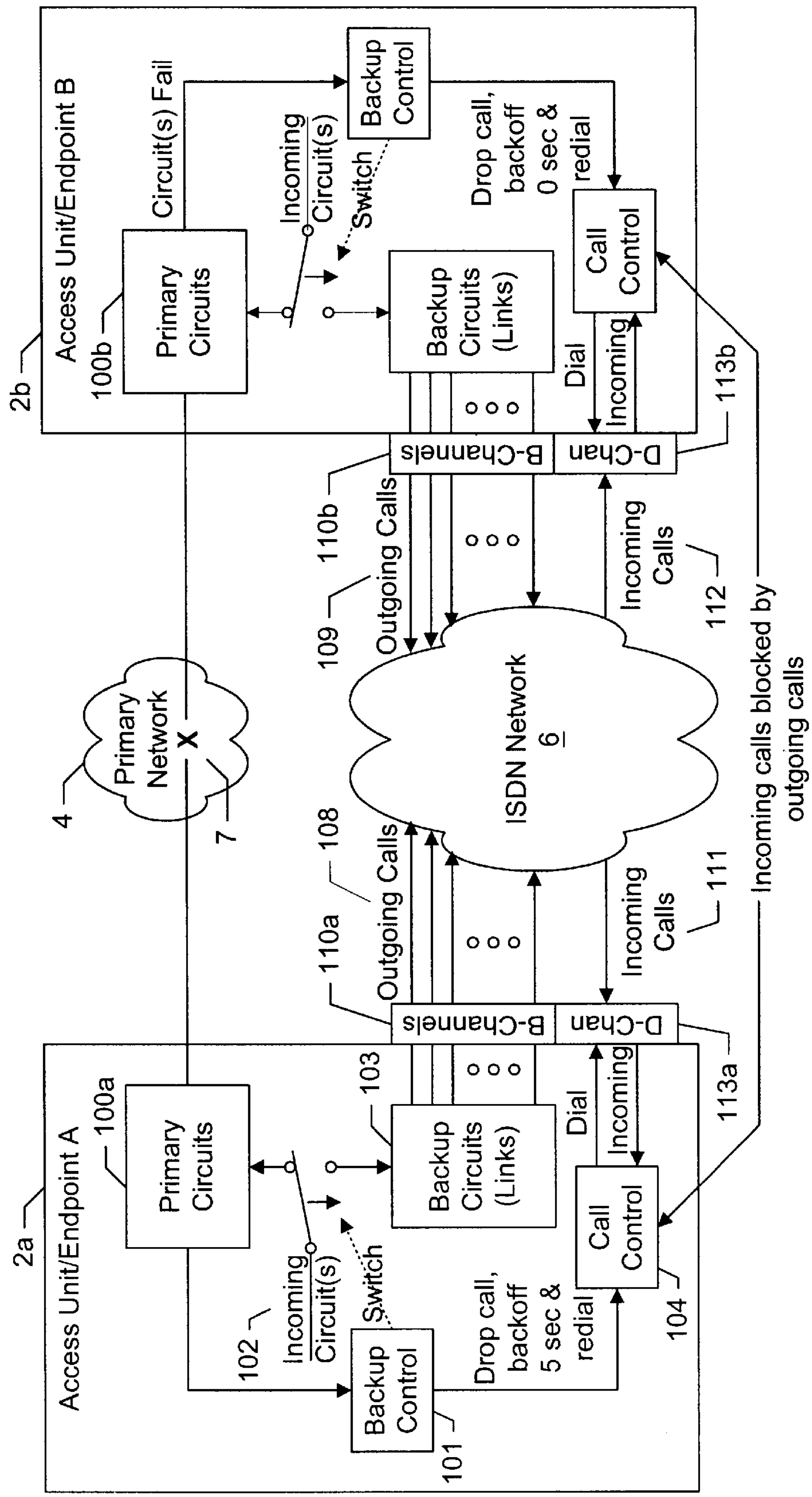
FIG. 3 is a functional block diagram of the access unit shown in FIG. 2, further illustrating the glare condition and the glare reduction system of the present invention.

The glare condition problem and the solution provided by the present invention can best be understood by referring to the functional block diagram of FIG. 3. The primary circuits 100*a* at endpoint A 2*a* have circuitry that is configured to sense when a network failure 7 develops in the primary network 4. The primary network 4 can include any type of network protocol (e.g., frame relay, asynchronous transfer mode, T-1, hard wired network, etc.). When a circuit failure 7 develops, the primary circuits 100*a* notifies the backup control 101. Backup control 101 then switches the incoming circuits 102 from primary circuits 100*a* to backup circuits 103 and alerts call control 104 that there is a network failure 7. Call control 104 then immediately launches into dialing the telephone number associated with endpoint B, particularly access unit 2*b*, with which it was connected to prior to the network failure 7. A more detailed description of backup network systems can be found in provisional application No. 60/078,197, the disclosure of which is hereby incorporated by reference.

Without implementation of the present invention, a glare condition can occur when two endpoints call each other, in response to a backup condition, in such as way that the outgoing call(s) use all available resources thereby blocking the incoming call(s) from the other end. Referring to FIG. 3, the glare condition occurs when access unit 2*a* associated with endpoint A and the access unit 2*b* associated with endpoint B sense the network failure 7 simultaneously or substantially concurrently, and then each endpoint A and B simultaneously launch outbound calls 108 and 109 on at least some of their available B-channels 110*a* and 110*b*. Thus, neither endpoint A, B will be able to connect the incoming calls 111, 112 even if they have available B channels 110*a*, 110*b* upon which to answer incoming calls 111, 112.

There are at least five cases that result in a glare condition, which causes connection problems. These will be analyzed in detail hereafter from the standpoint of endpoint A for simplicity. However, it should be understood that endpoint B generally mirrors the actions of endpoint A.

The first case of glare condition can occur when there are no B channels 110*a* available to accept incoming calls and the outgoing call 108 is rejected by the network. Here, endpoint A detects the failure 7 and originates outbound calls 108 on all B channels 110*a*. If endpoint B discovers the failure 7 at the same time as endpoint A, then it will also launch its own outgoing calls 109 on all available B channels 110*b*. Consequently, the incoming calls 111 will be blocked by the outgoing calls 108 at endpoint A, and vice versa. The network consequently signals to the originating endpoint that no channels are available.

The second through fifth case generally differs from the first case in that the receiving endpoint determines that there is a glare condition, not the network. The second case of glare condition can occur where there are no B channels 110*a* available to accept incoming calls, and the caller identification (caller ID) service is available at the endpoints A, B. In this case, endpoint A detects the failure 7 and launches outbound calls 108 on all B channels 110*a*. Endpoint B does the same. Endpoint A then receives incoming call requests with the caller ID, but has no B channels 110*a* available on which to answer incoming calls 111.

The third case of glare condition can occur when there are no B channels 110*a* available to accept incoming calls and caller ID is not available at the endpoints A, B. Here, endpoint A detects the failure 7 and launches outbound calls 108 on all B channels, 110*a*. Endpoint B does the same. Endpoint A then receives an incoming call request with no caller ID. However, there are no B channels 110*a* available to answer the incoming call 111 so it must be rejected.

The fourth and fifth cases of glare condition can occur when both endpoints' calls 108, 109 actually make connection, but there are no links 102 available, so one side has to drop its outgoing connected call in order to free up its data link 102. In the fourth case, caller ID is present, while in the fifth case, there is an exchange identification (XID) that occurs which is similar to caller ID, but occurs over the B channel instead of the D channel.

The glare reduction system of the present invention will eliminate most of the connection delay problems that result when each endpoint A, B simultaneously detect the network failure 7. The first step is to detect the glare condition. In the present embodiment, the call control element of the endpoint, for example call control 104 of endpoint A 2*a*, either receives an indication of glare condition from the network or makes that determination internally. The glare condition is then communicated to the virtual circuit backup logic 58.

When one of the aforementioned five cases of glare condition is detected, the virtual circuit backup logic 58 arbitrates between the two endpoints and resolves the glare condition with line control functionality directed to the call control 104 of the respective access unit. In order to arbitrate between the calls, some method of differentiation is needed, such as a unique identification number. In this embodiment the telephone number is used. However, one skilled in the art should appreciate that the identification number is not limited to the telephone number, but could also be the endpoints' Internet protocol (IP) address or some other randomly or strategically assigned identification number.

With respect to the first case, the glare detection and arbitration procedure implemented by the Virtual Circuit Backup Logic 58 (FIG. 2) in coordination with other access unit components can best be understood with reference to flow charts set out in FIGS. 4A through 4D, which illustrate the software architecture of the virtual circuit backup logic 58 (FIG. 2). The flow charts show the architecture, functionality, and operation of a possible implementation of the software of the Virtual Circuit Backup Logic 58. In this regard, each block represents a module, segment, or portion of code, which comprises one or more executable instructions for implementing the specified logical function(s). It should also be noted that in some alternative implementations, the functions noted in the blocks may occur out of the order noted in figures. For example, two blocks shown in succession in a figure may in fact be executed substantially concurrently or the blocks may sometimes be executed in the reverse order, depending upon the functionality involved, as will be further clarified hereinbelow.

Figure 4A:
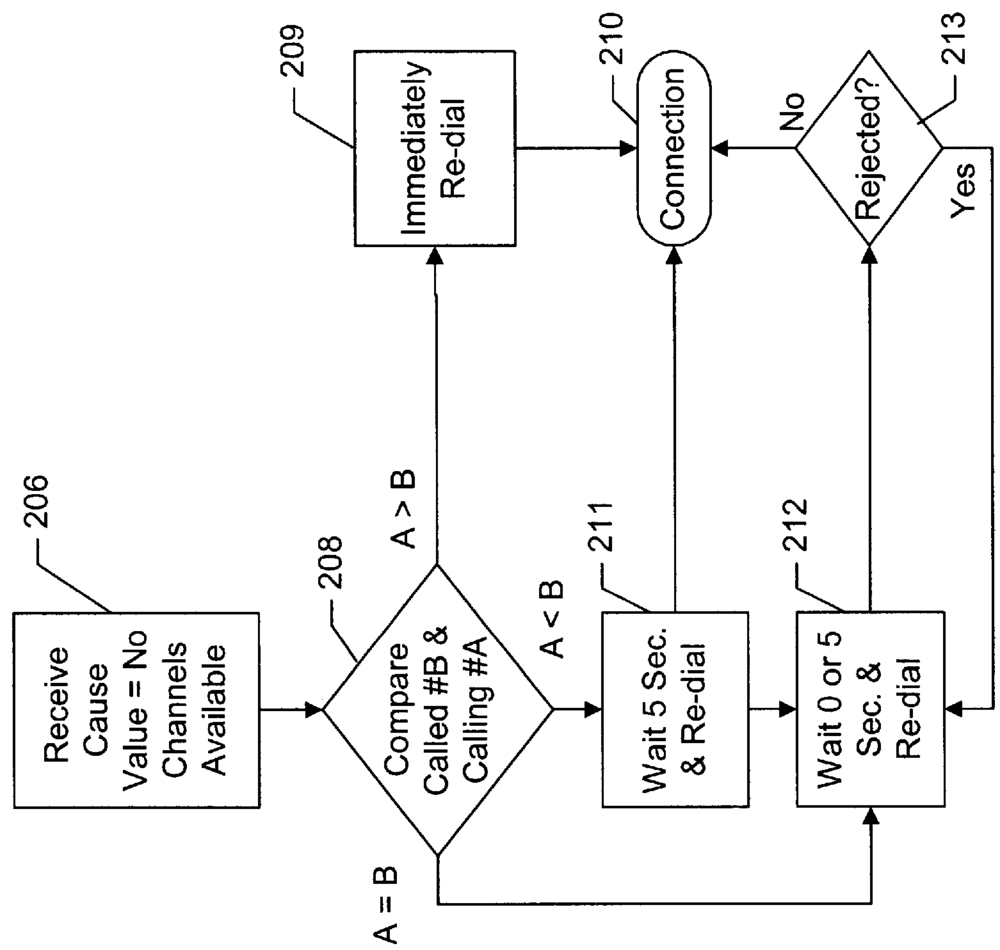
FIG. 4A is a flowchart showing the software architecture of the virtual circuit backup logic depicted in FIG. 2.

Referring to FIG. 4A, once backup procedures have been initiated and the call control 104 of both endpoints A 2*a* and B 2*b* has launched calls resulting in all available B channels being used for outgoing calls, the first glare condition arises. When this glare condition occurs, call control 104 will have its outgoing calls rejected by the backup network 6. The network sends a cause value to the call originating endpoint (for example, each endpoint 2*a* and 2*b*) indicating that there are no channels available. This glare condition is communicated by the call control 104 to the Virtual Channel Backup Logic 58, as indicated at block 206. The Virtual Channel Backup Logic 58 compares the called number (i.e. the destination number) to the calling number (i.e. the originating number), which is denoted at block 208. If the calling number A is greater than the called number B for the outgoing call, then endpoint A is deemed the dominant endpoint and Virtual Channel Backup Logic 58 will allow call control 104 to immediately redial, as indicated at block 209. The Virtual Circuit Backup Logic of the endpoint B 2*b* will have performed the same comparison and would have caused the endpoint B 2*b* to drop its outgoing calls, thus allowing call control 104 at endpoint A to connect, as indicated at block 210. Otherwise, as indicated at block 211, if the calling number was less than the called number, the Virtual Channel Backup Logic 58 will cause call control 104 to wait five seconds before redialing. This will allow endpoint B to connect immediately, as shown at block 210. Again, the Virtual Channel Backup Logic of the remote endpoint, for example 2*b*, will perform the same comparison. Finally, if the calling number and the called number are identical, then the Virtual Channel Backup Logic 58 will cause the call control 104 to initiate a wait period, for example, a randomly chosen wait period. In the preferred embodiment, the Virtual Channel Backup Logic 58 causes the call control 104 to choose randomly between 0 and 5 seconds, before attempting a redial, as indicated at block 212. If the endpoints 2*a* and 2*b* have equal waiting periods, the Virtual Channel Backup Logic 58 of each endpoint will cause the call control 104 at each respective endpoint again to choose randomly between 0 and 5 seconds, as indicated at block 213, until there is a resolution. When call controls 104 at the endpoints ultimately choose a different wait period, then a connection will be established, as shown in block 210.

Figure 4B:
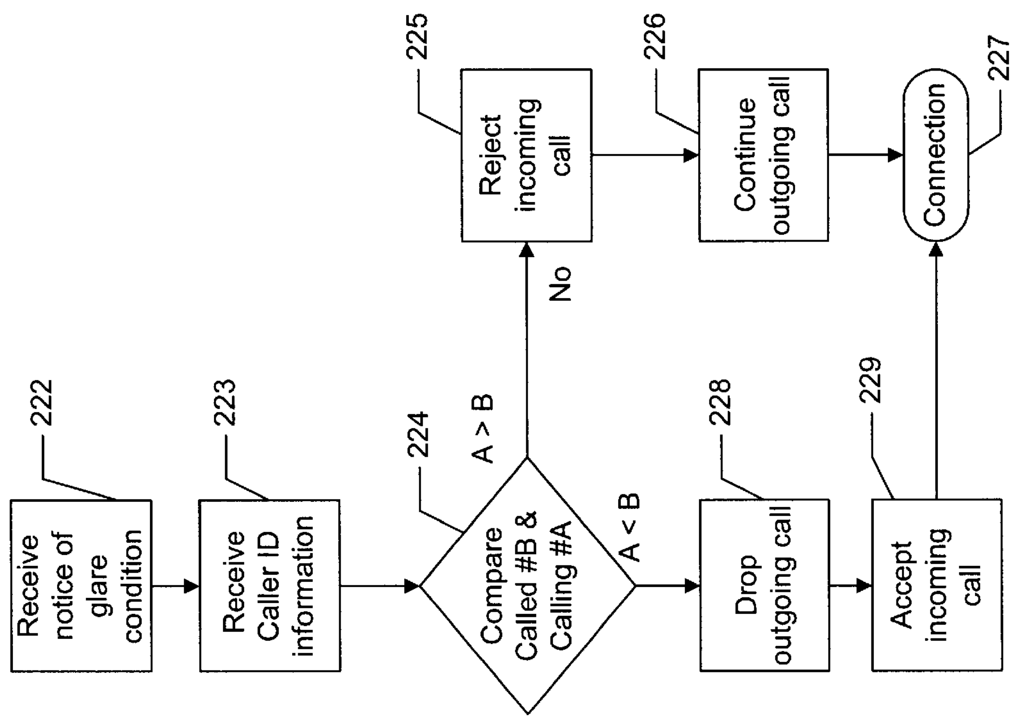
FIG. 4B is a flowchart showing the software architecture of an alternative embodiment of the virtual circuit backup logic depicted in FIG. 2.

With respect to the second case of glare condition, the detection and arbitration procedure of Virtual Channel Backup Logic 58 in coordination with other access unit elements can best be understood with reference to FIG. 4B. As described previously, the second case of glare condition arises when no B channels are available to accept an incoming call. Call control 104 detects the glare condition and communicates the occurrence of this condition to Virtual Channel Backup Logic 58 (block 222). Call control 104 also senses an incoming call on the D-channel and receives caller ID information for the incoming call. Call control 104 communicates the caller ID information to the Virtual Channel Backup Logic 58 (223). Virtual Channel Backup Logic 58 then compares the called number (i.e. the originating number) A to the calling number B obtained from the caller ID to determine which call is dominant 224. If A is greater than B, then the Virtual Channel Backup Logic 58 causes the incoming call to be rejected 225, and the Virtual Channel Backup Logic 58 allows the call control 104 to continue its outgoing call 226 until a connection is established 227. Otherwise, if A is less than B, the Virtual Channel Backup Logic 58 will cause the call control 104 to drop the outgoing call 228 to answer the incoming call 229, thus establishing a connection 227.

With respect to the third case of the glare condition, the arbitration procedure is very similar to the first case. Here, endpoint A and endpoint B reject the incoming calls (as distinguished from a network rejection of the first case). When each endpoint A, B identifies the glare condition, both would perform a comparison identical to the comparison performed in the first case.

Figure 4C:
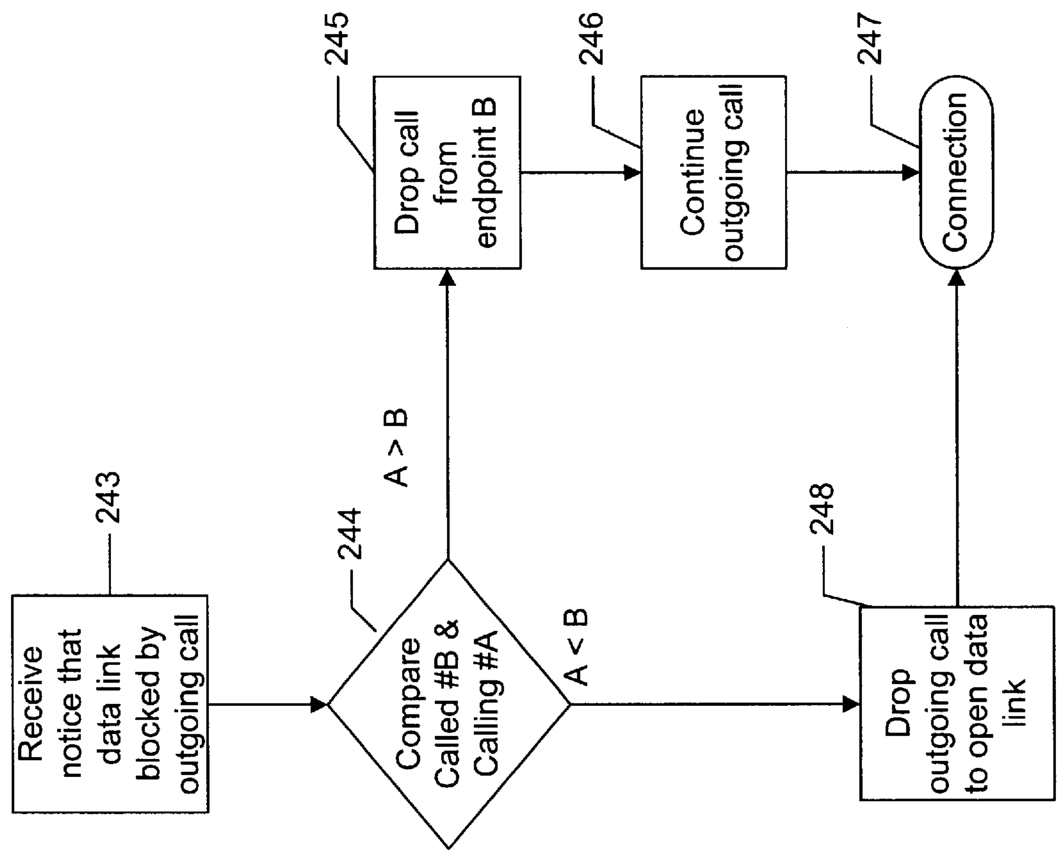
FIG. 4C is a flowchart showing the software architecture of a second alternative embodiment of the virtual circuit backup logic depicted in FIG. 2.

The fourth case of glare condition reduction can be best understood with reference to FIG. 4C. After call control 104 dials endpoint B, an incoming call with caller ID information is answered. At the same time, the outgoing call from endpoint A is answered by endpoint B. Thus, two calls are simultaneously connected, but endpoint A (i.e. call control 104) makes the determination that there are no data links available, and communicates this glare condition occurrence to Virtual Channel Backup Logic 58 as indicated at block 243. The Virtual Channel Backup Logic 58 then compares the called number B with the calling number A (from caller ID) at block 244. If the calling number A is greater than the called number B, the Virtual Channel Backup Logic 58 will cause the call control 104 to drop the connected call originated by endpoint B, as indicated at block 245, and continue its outgoing call at block 246 until endpoint B frees up its link for connection at block 247. If the calling number A is not greater than the called number B, the Virtual Channel Backup Logic 58 causes the call control 104 to drop its connected outgoing call at block 248, freeing up its data link, as denoted at block 249, for a connection to be established, as shown at block 247.

Figure 4D:
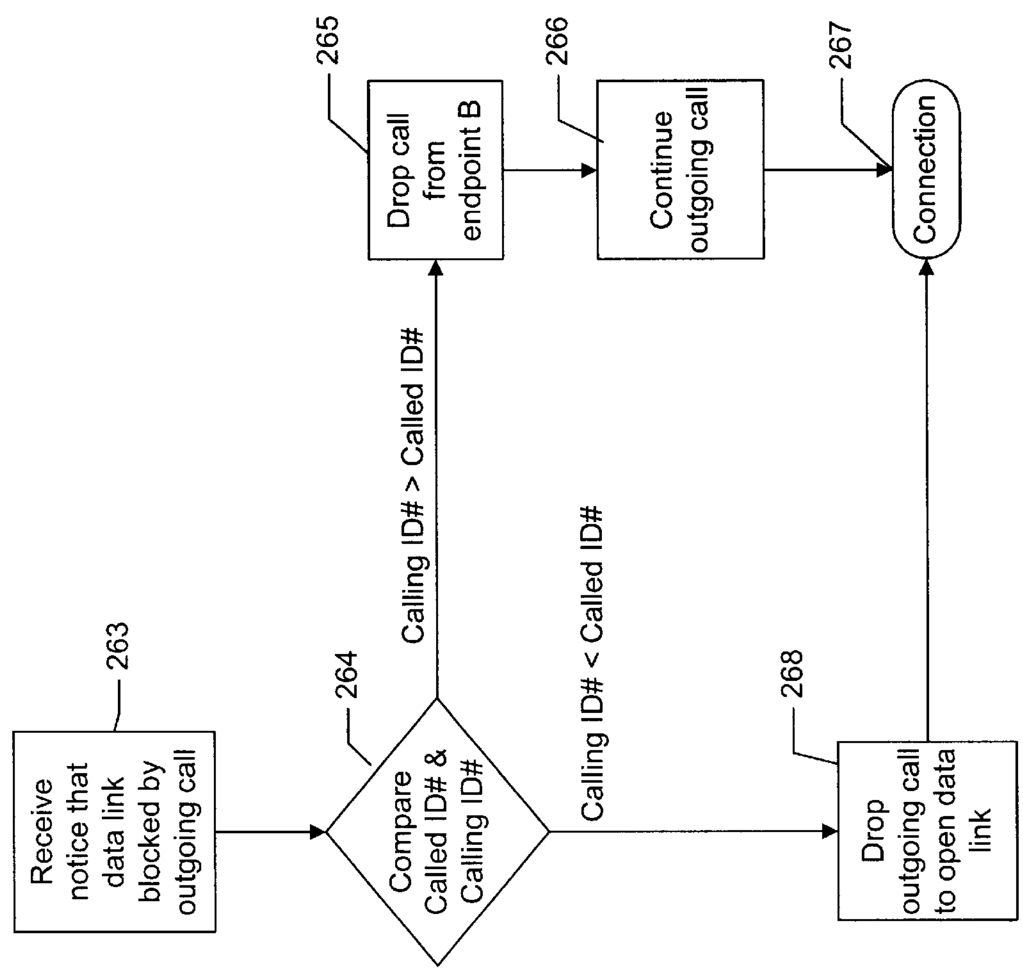
FIG. 4D is a flowchart showing the software architecture of a third alternative embodiment of the virtual circuit backup logic depicted in FIG. 2.

The fifth case glare condition reduction is slightly different than the fourth case and can be understood with reference to FIG. 4D. Here, after endpoint A dials endpoint B, an incoming call is answered and its identification is exchanged (XID). Simultaneously, the outbound call from endpoint A is answered and XID occurs. As described earlier, the occurrence of no data link available is communicated to the Virtual Channel Backup Logic 58, as indicated at block 263. The Virtual Channel Backup Logic 58 then compares the calling system ID (as identified by the XID) to the called system ID at block 264. If the calling number is greater than the called number, the Virtual Channel Backup Logic 58 of endpoint A 2*a* causes the call originated by endpoint B to be dropped, as indicated at block 265, and endpoint A continues its outgoing call at block 266 until a connection is established block 267. If the calling number is not greater than the called number, then the outgoing call from endpoint A is dropped to open up a link, as shown at block 268, allowing a connection to be established at block 267.

One skilled in the art should appreciate that this is merely an example of one test that could be used to decide which system immediately retries and which system waits. The invention here is not limited to this particular arbitration test, and the comparison could be reversed or could take an entirely different form. This disclosure is intended to include all comparisons that can be made for the purpose of choosing which endpoint dominates in the connection process.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A call control circuit, comprising:

a glare detection circuit operable to receive a dial signal associated with the call control circuit and a cause value from a backup circuit which is operable to communicate with a plurality of remote endpoints through a dialing protocol, the glare detection circuit being further operable to assert a glare present signal responsive to the dial signal and the cause value being asserted;

an arbitration circuit operable to receive the glare present signal and produces an arbitration signal responsive to an arbitration procedure upon the glare present signal being asserted; and a line control circuit operable to receive the arbitration signal and determine whether the call control circuit will discontinue an outgoing call on the backup circuit and wait a specified period of time for an incoming call on the backup circuit or wait for the outgoing call on the backup circuit to be answered.

2. The system of claim 1, wherein the arbitration procedure comprises the steps of:

comparing a remote endpoint ID number with a local endpoint ID number; and deciding which endpoint shall dominate, based upon the comparison.

3. The system of claim 2, wherein the remote endpoint ID number and the local endpoint ID number are their respective telephone numbers.

4. The system of claim 1, wherein the glare detection circuit is further operable to assert the glare present signal when an outgoing call is rejected by a remote endpoint.

5. The system of claim 1, wherein a connection is made to the remote endpoints through an ISDN dialing protocol.

6. A call control circuit, comprising:

a glare detection circuit operable to receive an outgoing call information signal from the call control circuit, and an exchange identification signal via a backup circuit, the backup circuit being operable to communicate with a plurality of remote endpoints via a dialing protocol, the glare detection circuit being further operable to assert a glare present signal responsive to an identity between the outgoing call information signal and exchange identification signal;

an arbitration circuit that receives the glare present signal and the exchange identification signal, and when the glare present signal is asserted, performs a comparison between the exchange identification signal and a local telephone number, and produces an arbitration signal based upon the comparison; and a line control circuit that receives the arbitration signal and determines whether the call control circuit will discontinue an outgoing call on the backup circuit and establish a valid connection on a connected call via the backup circuit, or wait for the outgoing call on the backup circuit to be answered.

7. The system of claim 6, wherein the arbitration signal indicates that the outgoing call will be discontinued responsive to an exchange identification signal indicating that a telephone number associated with the connected call is greater than the telephone number associated with the call control circuit.

8. The system of claim 7, wherein the arbitration signal indicates that the call control circuit will wait for the outgoing call to be answered and disconnect the connected call responsive to an exchange identification signal indicating that a telephone number associated with the connected call is less than the telephone number associated with the call control circuit.

9. The system of claim 6, wherein a connection is made to the remote endpoints through an ISDN dialing protocol.

10. A call control circuit, comprising:

means for detecting a glare condition between a local endpoint and a remote endpoint when each endpoint has placed an outgoing call to the other and a network coupling the local and remote endpoints to each other supplies a cause value signal to each of the local and remote endpoints, the means for detecting a glare condition being operable to assert a glare present signal responsive to the cause value signal and the dial signal being asserted;

means for arbitrating between the local endpoint and the remote endpoint responsive to the glare present signal being asserted; and means for controlling the outgoing call responsive to the arbitrating means.

11. A method of call control at a first endpoint, comprising the steps of:

attempting to connect to a remote system associated with a second endpoint through a backup network;

receiving a cause value from the backup network;

detecting a glare condition between the first and second endpoints responsive to the cause value;

arbitrating between the first and second endpoints responsive to the glare condition to determine whether the first or second endpoints should retry; and establishing a connection between the first and second endpoints via the backup network responsive to the arbitrating step.

12. The method of claim 11, wherein the arbitrating step comprises comparing the telephone number of the first endpoint to the telephone number of the second endpoint.

13. The method of claim 12, wherein the arbitrating step further comprises asserting an arbitration signal responsive to the comparing step.

14. The method of claim 13, wherein the arbitration signal indicates that the endpoint with the lower telephone number will cancel the connection attempt and wait for a period of time for the opposing endpoint to retry.

15. The method of claim 11, wherein the attempting to connect step further comprises using an ISDN dialing protocol to attempt to connect to the second endpoint via the backup network.

16. A method of call control at a local endpoint, comprising the steps of:

placing an outgoing call request via a backup network upon sensing a failure of a primary network which couples the local endpoint to a remote endpoint;

receiving an incoming call request from a remote endpoint via a backup network;

connecting the incoming call from the remote endpoint via the backup network;

receiving an exchange identification signal from the remote endpoint;

asserting a glare present signal responsive to an identity between an outgoing call information signal associated with the outgoing call request and the exchange identification signal, the glare present signal indicating a glare condition between the local endpoint and remote endpoint; and responsive to the assertion of the glare present signal, arbitrating between the local endpoint and remote endpoint responsive to the exchange identification signal and an identification number associated with the local endpoint.

17. The method of claim 16, wherein the arbitrating step comprises comparing the identification number of the local endpoint to the exchange identification signal from the remote endpoint.

18. The method of claim 17, wherein the arbitrating step further comprises asserting an arbitration signal responsive to the comparing step.

19. The method of claim 18, wherein the arbitration signal indicates that the endpoint with a lower identification number will cancel the connection attempt and wait for a period of time for the opposing endpoint to retry.

* * * * *